United States Patent
Hamada et al.

(10) Patent No.: US 10,913,993 B2
(45) Date of Patent: Feb. 9, 2021

(54) STEEL FOR HIGH-STRENGTH BOLT, AND HIGH-STRENGTH BOLT

(71) Applicant: NISSAN MOTOR CO., LTD., Yokohama (JP)

(72) Inventors: Takahiro Hamada, Kanagawa (JP); Tsuyoshi Nakamura, Kanagawa (JP); Kosuke Kimura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 404 days.

(21) Appl. No.: 15/506,506

(22) PCT Filed: Aug. 7, 2015

(86) PCT No.: PCT/JP2015/072508
§ 371 (c)(1),
(2) Date: Feb. 24, 2017

(87) PCT Pub. No.: WO2016/031528
PCT Pub. Date: Mar. 3, 2016

(65) Prior Publication Data
US 2017/0283921 A1    Oct. 5, 2017

(30) Foreign Application Priority Data

Aug. 29, 2014 (JP) .................. 2014-175466

(51) Int. Cl.
| | |
|---|---|
| *C22C 38/34* | (2006.01) |
| *C21D 6/00* | (2006.01) |
| *C21D 9/00* | (2006.01) |
| *C22C 38/04* | (2006.01) |
| *C22C 38/22* | (2006.01) |
| *F16B 31/06* | (2006.01) |
| *F16B 33/06* | (2006.01) |
| *F16B 35/00* | (2006.01) |
| *C22C 38/00* | (2006.01) |

(52) U.S. Cl.
CPC .............. *C22C 38/34* (2013.01); *C21D 6/002* (2013.01); *C21D 6/005* (2013.01); *C21D 6/008* (2013.01); *C21D 9/0093* (2013.01); *C22C 38/00* (2013.01); *C22C 38/04* (2013.01); *C22C 38/22* (2013.01); *F16B 31/06* (2013.01); *F16B 33/06* (2013.01); *F16B 35/00* (2013.01)

(58) Field of Classification Search
CPC ...... C21D 6/002; C21D 6/005; C21D 9/0093; C22C 38/00; C22C 38/04; C22C 38/22; C22C 38/34
See application file for complete search history.

(56) References Cited

U.S. PATENT DOCUMENTS

| | | | | |
|---|---|---|---|---|
| 2002/0174742 | A1* | 11/2002 | Kobayashi | F16C 33/60 74/640 |
| 2008/0041503 | A1* | 2/2008 | Torizuka | C21D 7/02 148/599 |
| 2012/0247618 | A1* | 10/2012 | Hirakami | C21D 8/065 148/208 |
| 2014/0217682 | A1* | 8/2014 | Niwa | F16J 15/067 277/632 |

FOREIGN PATENT DOCUMENTS

| | | |
|---|---|---|
| JP | 2002-173739 A | 6/2002 |
| JP | 2003-073769 A | 3/2003 |
| JP | 2003-73769 A | 3/2003 |
| JP | 2004-76086 A | 3/2004 |
| JP | 2006-22371 A | 1/2006 |
| JP | 2006-187679 A | 7/2006 |
| JP | 2013-139631 A | 7/2013 |
| JP | 2013-139872 A | 7/2013 |
| JP | 2016-50605 A | 4/2016 |
| WO | WO-2011/048971 A1 | 4/2011 |

OTHER PUBLICATIONS

Yuuji Kimura et al., Fabrication of Ultra High Strength Bolt and Its Mechanical Properties, Steel Construction Engineering, vol. 14, No. 54, Jun. 2007, pp. 121-127.

* cited by examiner

*Primary Examiner* — Ngoc-Yen Nguyen
(74) *Attorney, Agent, or Firm* — Foley & Lardner LLP

(57) ABSTRACT

A steel for a high-strength bolt that includes from 0.50 mass % to 0.65 mass % carbon, from 1.5 mass % to 2.5 mass % silicon, 1.0 mass % or more chromium, 0.4 mass % or less manganese, greater than 1.5 mass % molybdenum, 0.03 mass % or less phosphorus and sulfur combined, and balance iron and inevitable impurities.

12 Claims, 2 Drawing Sheets

STEEL FOR HIGH-STRENGTH BOLT, AND HIGH-STRENGTH BOLT

TECHNICAL FIELD

The present invention relates to steel for a high-strength bolt and a high-strength bolt. In more detail, the present invention relates to steel for a high-strength bolt with high resistance to delayed fracture and to a high-strength bolt that is formed using the steel.

BACKGROUND ART

Steel for mechanical structure with high strength and high resistance to delayed fracture has been proposed that also has good recyclability due to the simple composition and does not require a complex heat treatment (see Patent Document 1).

The steel for mechanical structure has a composition in wt % of C: from 0.2% to 0.7%, Si: from 0.2% to 2.55%, Mn: from 0.05% to 1.0%, Cr: from 0.2% to 1.5%, Mo: from 0.3% to 1.5% and balance Fe and inevitable impurities, in which the total amount of alloy elements satisfies Si+Mn+Cr+Mo≤5 wt %. The steel for mechanical structure is tempered at a temperature within the range of 500° C. to Ae1 in the condition of the tempering parameter λ of λ=T (20+log t)≥15800 (T being temperature (K), and t being time (h)). The steel for mechanical structure has a tensile strength of 1800 MPa or more.

CITATION LIST

Patent Literature

Patent Document 1: JP 2003-73769A

SUMMARY OF INVENTION

Technical Problem

However, a problem with a bolt that is formed using the steel for mechanical structure described in Patent Document 1 is that it does not sufficiently meet a request for a further improvement in resistance to delayed fracture.

The present invention has been made in view of the problem with the prior art. It is therefore an object of the present invention to provide steel for a high-strength bolt with high resistance to delayed fracture and a high-strength bolt that is formed using the steel.

Solution to Problem

The present inventors have made a keen study in order to achieve the above-described object. As a result, they found that the above-described object can be achieved by using steel for a high-strength bolt having a predetermined composition, and the like. The present invention has been thus completed.

That is, the steel for a high-strength bolt of the present invention contains from 0.50 mass % to 0.65 mass % carbon, from 1.5 mass % to 2.5 mass % silicon, 1.0 mass % or more chromium, 0.4 mass % or less manganese, greater than 1.5 mass % molybdenum, 0.03 mass % or less phosphorus and sulfur combined, and balance iron and inevitable impurities.

The high-strength bolt of the present invention is formed using the above-described steel for a high-strength bolt of the present invention.

Advantageous Effects of Invention

In the present invention, the steel for a high-strength bolt contains from 0.50 mass % to 0.65 mass % carbon, from 1.5 mass % to 2.5 mass % silicon, 1.0 mass % or more chromium, 0.4 mass % or less manganese, greater than 1.5 mass % molybdenum, 0.03 mass % or less phosphorus and sulfur combined, and balance iron and inevitable impurities. Therefore, it is possible to provide the steel for a high-strength bolt with high resistance to delayed fracture and the high-strength bolt that is formed using the steel.

DESCRIPTION OF EMBODIMENTS

Figure 1:
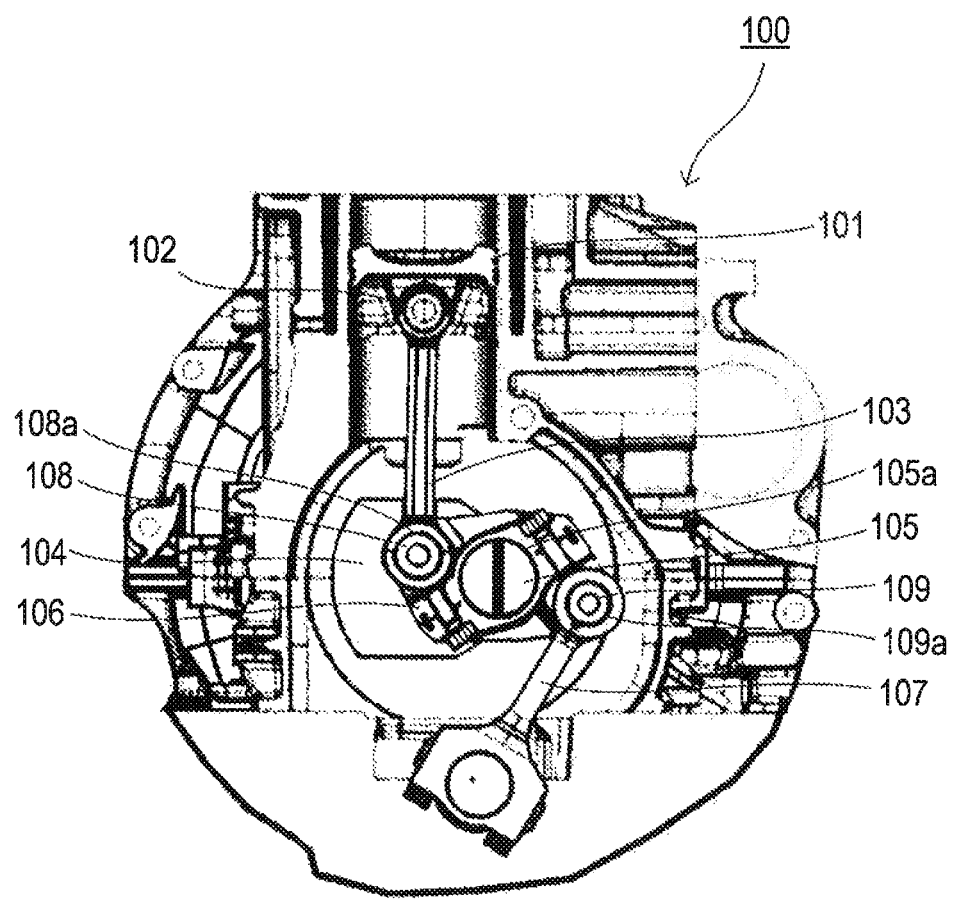
FIG. 1 is a partial cross sectional view of an example of a reciprocating engine with multi-link mechanism.

Hereinafter, the steel for a high-strength bolt and the high-strength bolt that is formed using the steel of the present invention will be described in detail.

First Embodiment

First, steel for a high-strength bolt according to a first embodiment of the present invention will be described in detail. The steel for a high-strength bolt of the embodiment contains from 0.50 mass % to 0.65 mass % carbon, from 1.5 mass % to 2.5 mass % silicon, 1.0 mass % or more chromium, 0.4 mass % or less manganese, greater than 1.5 mass % molybdenum, 0.03 mass % or less phosphorus and sulfur combined, and balance iron and inevitable impurities. This configuration enables a bolt with high resistance to delayed fracture and high strength. Further, a bolt that is formed using the steel has high resistance to delayed fracture and high strength.

Carbon (C): from 0.50 mass % to 0.65 mass %

When the carbon content is less than 0.50 mass %, the resistance to temper softening is insufficient. Since high-temperature tempering described below cannot be performed, high resistance to delayed fracture is not achieved. When the carbon content is greater than 0.65 mass %, the amount of cementite, which traps hydrogen, is remarkably increased. Accordingly, high resistance to delayed fracture is not achieved.

Silicon (Si): from 1.5 mass % to 2.5 mass %

When the silicon content is less than 1.5 mass %, the resistance to temper softening is insufficient. Since high-temperature tempering described below cannot be performed, high resistance to delayed fracture is not achieved. When the silicon content is greater than 2.5 mass %, the forgeability is remarkably degraded. Accordingly, it is impossible to form a predetermined bolt.

Chromium (Cr): 1.0 mass % or more

When the chromium content is less than 1.0 mass %, the resistance to temper softening is insufficient. Since high-temperature tempering described below cannot be performed, high resistance to delayed fracture is not achieved. The chromium content is preferably equal to or less than 1.4 mass %, but is not particularly limited.

Manganese (Mn): 0.4 mass % or less

When the manganese content is greater than 0.4 mass %, intergranular segregation of an intergranular segregating component is promoted, and the intergranular strength is thereby remarkably degraded. Accordingly, high resistance to delayed fracture is not achieved. The manganese content is preferably equal to or greater than 0.2 mass %, although it is not particularly limited as long as it is greater than 0 mass %.

Molybdenum (Mo): greater than 1.5 mass %
When the molybdenum content is less than 1.5 mass %, molybdenum-based carbide, which neutralizes hydrogen, is not produced to a sufficient amount. Accordingly, high resistance to delayed fracture is not achieved. The molybdenum content is preferably 1.65 mass % or less, although it is not particularly limited.

Phosphorus and Sulfur Combined (P+S): 0.03 mass % or less
When the total content of phosphorus and sulfur is greater than 0.03 mass %, the intergranular strength is remarkably degraded due to intergranular segregation. Accordingly, high resistance to delayed fracture is not achieved. The total content of phosphorus and sulfur is preferably equal to or less than 0.02 mass %, although it is not particularly limited.

Second Embodiment

Next, a high-strength bolt according to a second embodiment of the present invention will be described in detail. The high-strength bolt of the embodiment is formed using steel for a high-strength bolt according to an embodiment of the present invention. With this configuration, high resistance to delayed fracture and high strength are achieved.

For example, the high-strength bolt can be produced by cold-forging and then rolling the previously-described steel for a high-strength bolt, and thereafter performing a heat treatment that involves quenching at 920° C. or more and tempering at 570° C. or more. However, the production is not particularly limited. The high-strength bolt can also be produced even when the order of the rolling and the heat treatment (quenching and tempering) is changed.

For example, the high-temperature tempering at 570° C. or more spheroidizes and finely disperses intergranular cementite, which can improve the intergranular strength.

In the embodiment, it is preferred that the bolt has one or both of iron phosphate coating and chromium plate coating on the surface.

Providing such coating on the surface can further improve the resistance to delayed fracture.

Figure 2:
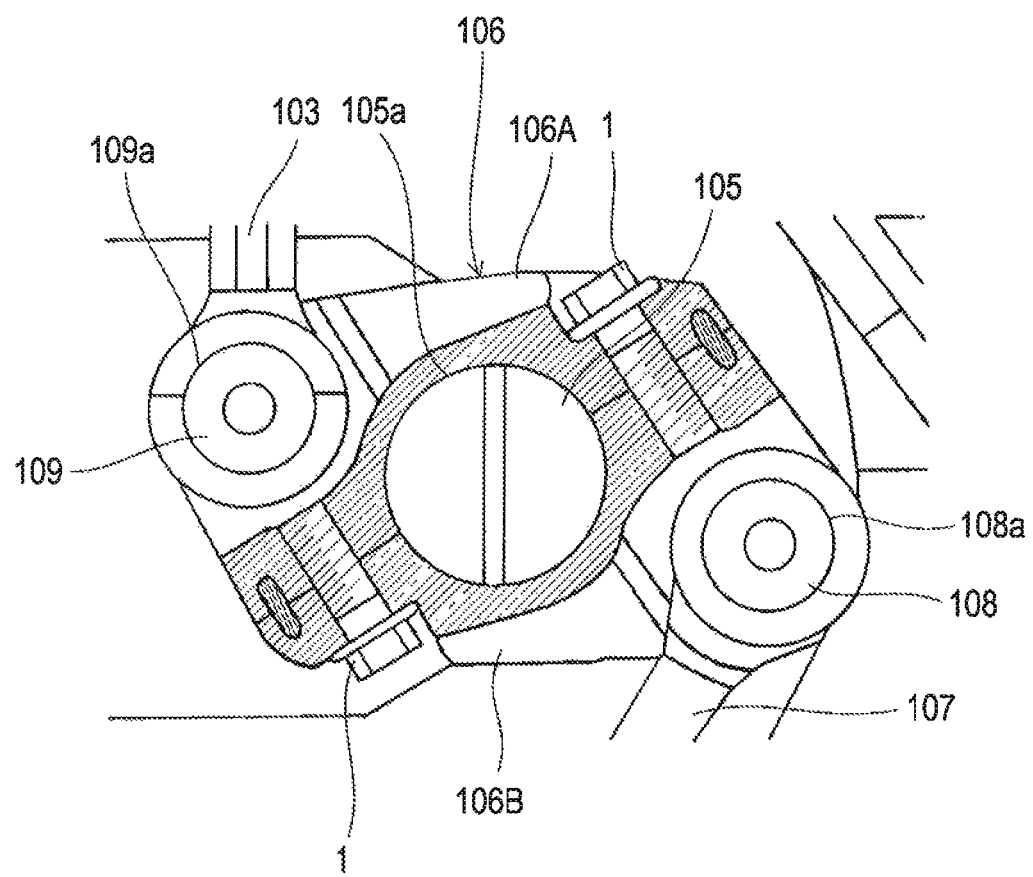
FIG. 2 is a schematic cross sectional view of an example of a lower link in FIG. 1.

An example of the high-strength bolt of the embodiment will be described in more detail referring to the drawings. FIG. 1 is a partial cross sectional view of an example of a reciprocating engine with multi-link mechanism. FIG. 2 is a schematic cross sectional view of an example of a lower link in FIG. 1.

As illustrated in FIG. 1, the reciprocating engine 100 includes an upper link 103 coupled to a piston pin 102 of a piston 101, a lower link 106 that couples the upper link 103 to a crankpin 105 of a crankshaft 104, and a control link 107 that is swingably supported by the engine 100 at one end and is coupled to the lower link 106 at the other end. The upper link 103 and the lower link 106 are rotatably coupled to each other via an upper pin 108. The control link 107 and the lower link 106 are rotatably coupled to each other by a control pin 109.

The lower link 106 receives a combustion pressure received by the piston 101 from the upper pin 108 via the upper link 103 and transmits the force to the crankpin 105 as a movement pivoted on the control pin 109. Accordingly, a large combustion pressure received by the piston 101 and an inertial load of the piston 101 are input to the lower link 106 from an upper pin bearing 108a via the piston pin 102, the upper link 103 and the upper pin 108. At the same time, a crankpin bearing 105a and a control pin bearing 109a are also subjected to such a load that balances the input load. In this way, each of the bearings (108a, 105a, 109a) are subjected to higher interface pressure compared to a typical reciprocating engine with mono-link mechanism.

Therefore, higher strength is required for the lower link. Further, it is also desired to reduce the size and weight of the lower link in terms of improving the fuel efficiency.

As illustrated in FIG. 2, the structure of the lower link 106 is typically such that split lower link parts 106A, 106B are fastened to each other by high-strength bolts 1. To achieve the above-described performance required for the lower link, high resistance to delayed fracture is required for the high-strength bolts. The high-strength bolt of the embodiment is particularly suitable for fastening such lower link parts, although the usage is not particularly limited. The reference signs 108a, 105a, 109a represent bearings.

EXAMPLES

Hereinafter, the present invention will be described in more detail with examples.

Example 1 to Example 8, Comparative Example 1 to Comparative Example 8 High-strength bolts of the examples and Comparative Examples were produced by cold-forging and then rolling the respective steels for a high-strength bolt having the composition listed in Table 1 and thereafter performing a heat treatment that involves quenching at 920° C. or more and tempering at 570° C. or more.

TABLE 1

| | Composition (mass %) | | | | | | | | Test Results | |
|---|---|---|---|---|---|---|---|---|---|---|
| | C | Si | Cr | Mn | Mo | P | S | P + S | Test 1 | Test 2 |
| Example 1 | 0.60 | 1.6 | 1.2 | 0.3 | 1.6 | 0.01 | 0.005 | 0.015 | OK | OK |
| Example 2 | 0.59 | 1.5 | 1.3 | 0.3 | 1.8 | 0.01 | 0.005 | 0.015 | OK | OK |
| Example 3 | 0.58 | 1.7 | 1.0 | 0.3 | 1.9 | 0.02 | 0.005 | 0.025 | OK | OK |
| Example 4 | 0.57 | 2.0 | 1.2 | 0.3 | 1.51 | 0.015 | 0.015 | 0.030 | OK | OK |
| Example 5 | 0.59 | 2.5 | 1.0 | 0.3 | 1.55 | 0.02 | 0.010 | 0.030 | OK | OK |
| Example 6 | 0.60 | 2.2 | 1.6 | 0.35 | 1.8 | 0.01 | 0.005 | 0.015 | OK | OK |
| Example 7 | 0.65 | 1.7 | 1.4 | 0.3 | 1.7 | 0.02 | 0.005 | 0.025 | OK | OK |
| Example 8 | 0.50 | 1.9 | 1.6 | 0.3 | 2.2 | 0.01 | 0.020 | 0.030 | OK | OK |
| Comparative Example 1 | 0.49 | 1.7 | 1.2 | 0.2 | 1.7 | 0.01 | 0.005 | 0.015 | NG | — |
| Comparative Example 2 | 0.66 | 1.6 | 1.5 | 0.3 | 1.6 | 0.01 | 0.005 | 0.015 | NG | — |
| Comparative Example 3 | 0.52 | 1.4 | 1.3 | 0.3 | 1.7 | 0.01 | 0.005 | 0.015 | NG | — |

TABLE 1-continued

|  | Composition (mass %) | | | | | | | Test Results | |
| --- | --- | --- | --- | --- | --- | --- | --- | --- | --- |
|  | C | Si | Cr | Mn | Mo | P | S | P + S | Test 1 | Test 2 |
| Comparative Example 4 | 0.53 | 2.6 | 1.6 | 0.3 | 1.8 | 0.01 | 0.005 | 0.015 | OK | NG |
| Comparative Example 5 | 0.53 | 1.6 | 0.9 | 0.3 | 1.6 | 0.01 | 0.005 | 0.015 | NG | — |
| Comparative Example 6 | 0.51 | 1.7 | 1.2 | 0.5 | 1.8 | 0.01 | 0.005 | 0.015 | NG | — |
| Comparative Example 7 | 0.55 | 1.7 | 1.4 | 0.3 | 1.5 | 0.01 | 0.005 | 0.015 | NG | — |
| Comparative Example 8 | 0.58 | 1.6 | 1.1 | 0.3 | 1.6 | 0.025 | 0.010 | 0.035 | NG | — |

Evaluation of Performance

Evaluation of Resistance to Delayed Fracture

The bolts of the examples and Comparative Examples were immersed in hydrochloric acid for a specified time. It was observed whether the bolts were broken. The results are shown in Table 1 as the results of Test 1. In the item Test 1, "OK" represents that a bolt was not broken, and "NG" represents that a bolt was broken.

Evaluation of Tensile Strength

The tensile strength of the bolts of the examples and Comparative Example were evaluated by a tensile test. It was confirmed that the bolts of the examples and Comparative Examples had a tensile strength of 1500 MPa or more.

Evaluation of Formability

A specified number of bolts were practically produced as a trial, and it was observed whether the die was broken or worn. The results are shown in Table 1 as the results of Test 2. In the item Test 2, "OK" represents that a die was neither broken nor worn, and "NG" represents that a die was broken or worn. Test 2 was conducted only for the Examples and Comparative Examples that were "OK" in Test 1.

As can be seen in Table 1, Example 1 to Example 8, which fall within the scope of the present invention, are high-strength bolts with high resistance to delayed fracture. In contrast, non-inventive examples Comparative Example 1 to 3 and 5 to 8 are inferior in resistance to delayed fracture. Further, Comparative Example 4 is remarkably inferior in forgeability, and it is therefore not applicable as steel for a high-strength bolt.

While the present invention is described with some embodiments and examples, the present invention is not limited thereto, and a variety of changes can be made within the features of the present invention.

For example, the configurations described in the above-described embodiments and examples are not limited to the individual embodiments and examples. For example, the composition, the detailed conditions of the production, the presence or absence of the coating can be changed. Further, the combination of the configuration of an embodiment or an example may be changed beyond the combinations of the above-described embodiments and examples.

Further, the above-described embodiment illustrates an example in which the high-strength bolt is applied to the lower link of the engine with multi-link mechanism. However, the application is not limited thereto, it should be understood that the bolt can be used for other purposes.

REFERENCE SINGS LIST

1 High-strength bolt
100 Reciprocating engine
101 Piston
102 Piston pin
103 Upper link
104 Crankshaft
105 Crankpin
105a Crankpin bearing
106 Lower link
106A, 106B Lower link parts
107 Control link
108 Upper pin
108a Upper pin bearing
109 Control pin
109a Control pin bearing

The invention claimed is:

1. A high-strength bolt containing: from 0.50 mass % to 0.65 mass % carbon, from 1.5 mass % to 2.5 mass % silicon, 1.0 mass % or more chromium, 0.4 mass % or less manganese, greater than 1.5 mass % molybdenum, 0.03 mass % or less phosphorus and sulfur combined, and balance iron and inevitable impurities, wherein a microstructure of the bolt comprises an intergranular cementite that is spheroidized and dispersed, and wherein the bolt has a tensile strength of 1500 MPa or more.

2. The high-strength bolt according to claim 1, comprising an iron phosphate coating and/or a chromium plate coating on a surface.

3. The high-strength bolt according to claim 1, containing 1.6 mass % or less chromium.

4. The high-strength bolt according to claim 1, containing 1.4 mass % or less chromium.

5. The high-strength bolt according to claim 1, containing greater than 0 mass % manganese.

6. The high-strength bolt according to claim 1, containing 0.2 mass % or more manganese.

7. The high-strength bolt according to claim 1, containing 2.2 mass % or less molybdenum.

8. The high-strength bolt according to claim 1, containing 1.65 mass % or less molybdenum.

9. The high-strength bolt according to claim 1, containing 0.02 mass % or less phosphorus and sulfur combined.

10. The high-strength bolt according to claim 1, further comprising an iron phosphate coating on a surface.

11. The high-strength bolt according to claim 10, further comprising a chromium plate coating on the surface.

12. The high-strength bolt according to claim 1, containing from 1.5 mass % to 2.2 mass % silicon, from 1.0 mass % to 1.4 mass % chromium, from 0.2 mass % to 0.4 mass % manganese, from 1.51 mass % to 2.2 mass % molybdenum.

* * * * *